(12) United States Patent
Fulton (10) Patent No.: US 10,286,746 B2
(45) Date of Patent: May 14, 2019

(54) HEAVY-DUTY VEHICLE AIR-RIDE SUSPENSION

(71) Applicant: Hendrickson USA, L.L.C., Itasca, IL (US)

(72) Inventor: R. Scott Fulton, Hudson, OH (US)

(73) Assignee: Hendrickson USA, L.L.C., Itasca, IL (US)

(*) Notice: Subject to any disclaimer, the term of this patent is extended or adjusted under 35 U.S.C. 154(b) by 186 days.

(21) Appl. No.: 15/662,364

(22) Filed: Jul. 28, 2017

(65) Prior Publication Data

US 2018/0043743 A1    Feb. 15, 2018

Related U.S. Application Data

(60) Provisional application No. 62/372,462, filed on Aug. 9, 2016.

(51) Int. Cl.
*B60G 17/052*    (2006.01)
*B60C 23/00*    (2006.01)
(Continued)

(52) U.S. Cl.
CPC .......... *B60G 17/052* (2013.01); *B60C 23/001* (2013.01); *B60G 15/10* (2013.01);
(Continued)

(58) Field of Classification Search
CPC .............. B60G 17/052; B60G 17/0565; B60G 17/0525; B60G 15/10; B60G 2500/202;
(Continued)

(56) References Cited

U.S. PATENT DOCUMENTS 5,461,564 A * 10/1995 Collins ............ B60G 17/01933
280/5.514
6,293,562 B1 * 9/2001 Kutscher .............. B60G 17/016
280/5.5

(Continued)

FOREIGN PATENT DOCUMENTS

DE    602004004694 T2    11/2007
DE    102007033527 A1    1/2009
(Continued)

*Primary Examiner* — Paul N Dickson
*Assistant Examiner* — Timothy Wilhelm
(74) *Attorney, Agent, or Firm* — Dureska & Moore, LLC; David P. Dureska; Greg Strugalski (57) ABSTRACT

An air-ride axle/suspension system for a heavy-duty vehicle. A frame and at least a pair of suspension assemblies support opposite ends of an axle for movement relative to the frame. An air spring is associated with one of the suspension assemblies that establishes a first relative position between the axle and the frame as a function of fluid pressure in the air spring. A tire and wheel assembly is operatively mounted to an end portion of the axle associated with the air spring. A sensor detects an inflation condition of the tire and wheel assembly. A venting system exhausts fluid pressure from the air spring to establish a second relative position between the axle and the frame that is different than the first relative position in response to detecting a predetermined inflation condition of the tire and wheel assembly.

20 Claims, 6 Drawing Sheets

(51) Int. Cl.
*B60G 15/10* (2006.01)
*B60G 17/056* (2006.01)

(52) U.S. Cl.
CPC ..... *B60G 17/0525* (2013.01); *B60G 17/0565* (2013.01); *B60G 2202/152* (2013.01); *B60G 2300/026* (2013.01); *B60G 2300/0262* (2013.01); *B60G 2400/52* (2013.01); *B60G 2400/94* (2013.01); *B60G 2500/202* (2013.01); *B60G 2600/044* (2013.01); *B60G 2800/01* (2013.01)

(58) Field of Classification Search
CPC ...... B60G 2300/0262; B60G 2600/044; B60G 2400/94; B60G 2202/152; B60G 2400/52; B60G 2300/026; B60G 2800/01; B60C 23/001
See application file for complete search history.

(56) References Cited

U.S. PATENT DOCUMENTS

| | | | | |
|---|---|---|---|---|
| 6,725,743 | B2* | 4/2004 | White | F16H 57/027 74/607 |
| 6,824,145 | B2* | 11/2004 | Behmenburg | B60C 23/10 152/416 |
| 7,841,608 | B2 | 11/2010 | Morris et al. | |
| 8,047,558 | B2* | 11/2011 | Ramsey | B60G 5/047 280/124.157 |
| 8,528,611 | B2* | 9/2013 | Wilson | B60C 23/003 152/416 |
| 8,540,222 | B2 | 9/2013 | Westnedge et al. | |
| 8,695,998 | B1* | 4/2014 | Karel | B62D 61/12 280/86.5 |
| 8,925,574 | B2* | 1/2015 | Wilson | B60B 35/08 137/351 |
| 8,973,633 | B2 | 3/2015 | Wilson et al. | |
| 9,248,707 | B2* | 2/2016 | Zhou | B60C 23/003 |
| 9,278,587 | B2* | 3/2016 | Honig | B60C 23/001 |
| 9,834,045 | B2* | 12/2017 | Freytag | G01M 17/02 |
| 2013/0343931 | A1* | 12/2013 | Wilson | B60C 23/003 417/410.1 |
| 2018/0312018 | A1* | 11/2018 | Wilson | B60G 17/052 |

FOREIGN PATENT DOCUMENTS

| | | |
|---|---|---|
| EP | 2366562 A1 | 9/2011 |
| WO | 2011021989 A1 | 2/2011 |
| WO | 2012068583 A1 | 5/2012 |

\* cited by examiner

HEAVY-DUTY VEHICLE AIR-RIDE SUSPENSION

CROSS-REFERENCE TO RELATED APPLICATION

This application claims the benefit of U.S. Provisional Patent Application Ser. No. 62/372,462 filed Aug. 9, 2016.

TECHNICAL FIELD

The subject matter of this application generally relates to a vehicle suspension system. In particular, this disclosure relates to a heavy-duty vehicle air-ride axle/suspension system that reacts in response to a predetermined condition of a vehicle tire and wheel assembly, such as a deflated condition.

BACKGROUND

Heavy-duty vehicles typically include trucks, tractors and trailers. Tractors often pull at least one trailer, and sometimes two or three trailers. The heavy-duty vehicles include axle/suspension systems that have multiple tires each mounted on a respective wheel or rim. Each tire and wheel assembly is inflated with a fluid or gas, such as air, to an operating or desired target pressure. A tire inflation system is often employed to monitor, control and maintain the target pressure in each tire and wheel assembly.

It is known that air may leak from a tire and wheel assembly, sometimes in a gradual manner and sometimes in a rapid manner, such as with a flat tire or a blowout. Any appreciable leak typically may result in an undesirable deflated or under-inflated condition of the tire and wheel assembly from the target pressure for which the tire inflation system may not be able to compensate. Such deflated or under-inflated condition of the tire and wheel assembly may go unnoticed by the operator of the heavy-duty vehicle. This deflated or under-inflated condition may render vehicle ride and handling undesirable to varying degrees. Further, when the tire and wheel assembly is in the deflated or under-inflated condition and the vehicle includes an air-ride axle/suspension system, air pressure typically remains in air springs of the air-ride axle/suspension system. The pressurized air spring may force an axle away from the frame. This may cause the wheel or rim to come into contact with a road or ground surface that can damage or destroy a relatively expensive wheel or rim and maybe the tire in some instances.

There is a need for preventing or minimizing damage to the wheel or rim, for alerting a vehicle driver or operator that an undesirable deflated or under-inflated condition of a tire and wheel assembly exists and render the ride and handling characteristics of the vehicle less undesirable during such condition.

SUMMARY

A summary is provided to introduce concepts of the subject matter of this application that are described below. This summary is not intended to identify essential features or limit the scope of the subject matter.

The limitations, drawbacks and disadvantages associated with previously known air-ride axle/suspension systems are overcome with a reactive heavy-duty vehicle air-ride axle/suspension system and method, according to aspects of this application. The reactive air-ride axle/suspension system and method for a heavy-duty vehicle, according to at least one aspect, satisfies the need for preventing or minimizing damage to the wheel or rim, for alerting a vehicle driver or operator that an undesirable deflated or under-inflated condition of a tire and wheel assembly exists and/or for reducing and/or eliminating undesirable ride and handling characteristics of the vehicle during such condition.

The reactive air-ride axle/suspension system for a heavy-duty vehicle is particularly suited to a wide base single tire system. It will be apparent that the improved and reactive air-ride axle/suspension system for a heavy-duty vehicle may be employed with a dual tire arrangement and on a heavy-duty vehicle with multiple axles.

In the reactive axle/suspension system, an undesirably abnormal condition, such as a deflated or under-inflated condition, of a tire and wheel assembly on a heavy-duty vehicle is detected. In response to detecting the deflated or under-inflated condition, at least one air spring associated with that deflated or under-inflated tire and wheel assembly may be exhausted. Exhausting the air spring prevents or minimizes the chance that the wheel is forced away from the frame of the vehicle so the affected wheel does not contact a road surface and damage the wheel and/or any remaining tire.

Also in certain situations, the frame of the trailer may lower to engage and ride on a bumper associated with the air spring to lower the center of gravity of the trailer and stiffen the suspension to enhance ride and handling characteristics. These changes to the ride and handling characteristics of the trailer may alert a vehicle operator of a potential issue with a tire.

Specifically, the improved and reactive air-ride axle/suspension system for a heavy-duty vehicle, according to one aspect, includes the heavy-duty vehicle having a frame. The heavy-duty vehicle also has at least a pair of suspension assemblies supporting a transversely extending axle for movement relative to the frame. At least one tire and wheel assembly is operatively mounted to the axle. At least one air spring is associated with the suspension assembly to which the tire and wheel assembly is mounted. The air spring establishes a first relative position of the axle and the frame as a function of fluid pressure in the at least one air spring. A sensor detects an inflation condition of the tire and wheel assembly. In response to detecting an abnormal or predetermined inflation condition of the tire and wheel assembly, a venting system exhausts fluid pressure from the air spring to establish a second relative position between the axle and the frame that is different than the first relative position.

A supply of air under pressure may be in fluid communication with the air spring and with the tire and wheel assembly. The sensor may detect flow of the fluid from the supply of air to the tire and wheel assembly. The venting system may exhaust fluid pressure from the air spring to establish the second relative position in response to the sensor detecting flow of the fluid from the supply of air to the tire and wheel assembly at an amount above a predetermined amount.

The sensor may detect fluid pressure in the tire and wheel assembly. The venting system may exhaust fluid pressure from the air spring to establish the second relative position in response to the sensor detecting the pressure in the tire and wheel assembly below a predetermined amount. The air-ride axle/suspension system may include a bumper located between the frame and axle. The bumper may contact the frame and the axle when the axle and frame are in the second relative position.

According to another aspect, a reactive suspension assembly system for a heavy-duty vehicle includes a vehicle frame. A first axle of a first axle/suspension system is supported for relative movement with the vehicle frame. A first air spring system establishes a first position of the first axle relative to the vehicle frame as a function of fluid pressure in the first air spring system. Each of a pair of first tire and wheel assemblies is mounted to a respective end of the first axle. A second axle of a second axle/suspension system is supported for relative movement with the vehicle frame. A second air spring system establishes a second position of the second axle relative to the vehicle frame as a function of fluid pressure of the second air spring system. Each of a pair of second tire and wheel assemblies is mounted to a respective end of the second axle. A sensor detects an inflation condition of at least one of the first or second tire and wheel assemblies. A venting system exhausts fluid pressure of the first and second air spring systems to establish a third relative position different than the first and second relative positions between the vehicle frame and the first and second axles in response to the sensor detecting a predetermined inflation condition of at least one of the first and second tire and wheel assemblies, such as a deflated, flat or blow out of the tire.

According to yet another aspect, a method of establishing a relative position between a vehicle frame and a relatively movable axle is provided. The method includes establishing a relative position between the axle and the vehicle frame as a function of fluid pressure in an air spring. A tire and wheel assembly is mounted to each respective end of the axle. An inflation condition of at least one tire and wheel assembly is determined. Fluid pressure from the air spring is vented or exhausted to assure that the axle is not forced away from the vehicle frame in response to detecting that a predetermined inflation condition of the tire and wheel assembly exists. The predetermined condition may be a deflated, flat or catastrophic blowout of the tire.

DRAWINGS

The description and drawings set forth illustrative aspects and implementations of the subject matter of this application. These are indicative of various exemplary ways in which one or more aspects and/or implementations may be employed. Similar numerals refer to similar parts throughout the description and drawings. Other aspects, advantages and features will become apparent from reading the description with reference to the accompanying drawings, in which.

DESCRIPTION

The following description is to provide an understanding of the subject matter of this application, for exemplary purposes and without limitation. It will be understood that the subject matter can be employed, practiced and implemented in ways other than by the specific examples described and illustrated.

Figure 1:
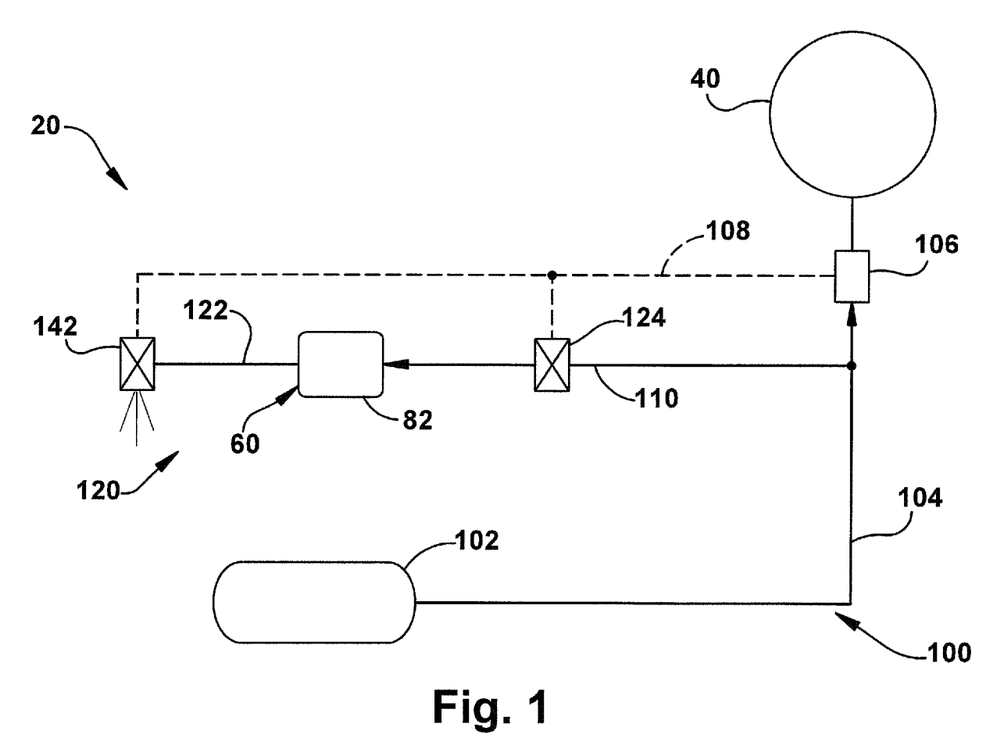
FIG. 1 is a schematic view of a reactive suspension assembly system for a heavy-duty vehicle, according to one aspect.
Figure 2:
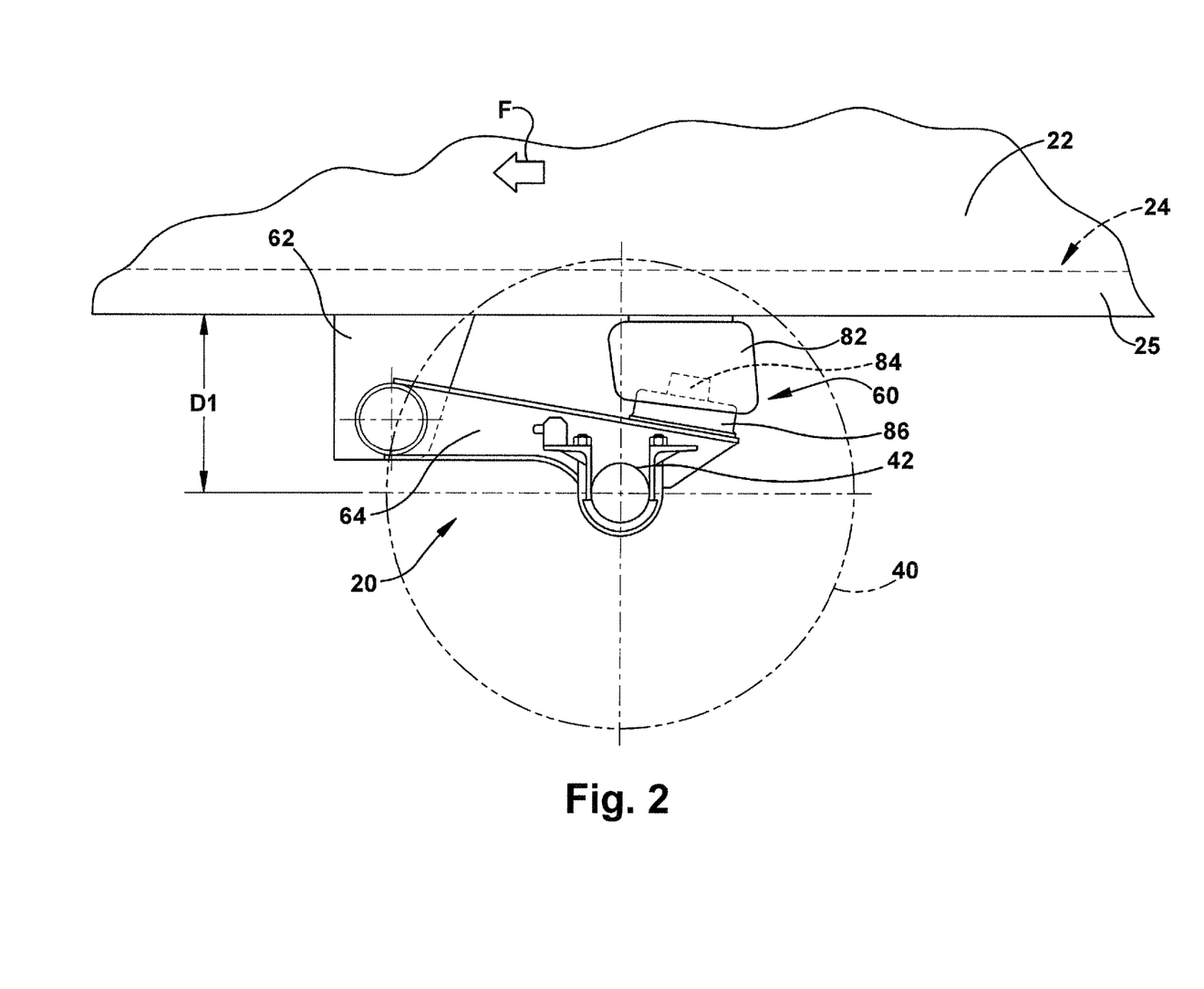
FIG. 2 is a fragmentary side elevation view, with portions of some components shown in phantom, of a portion of the reactive suspension assembly system illustrated in FIG. 1 with components in one relative position.
Figure 3:
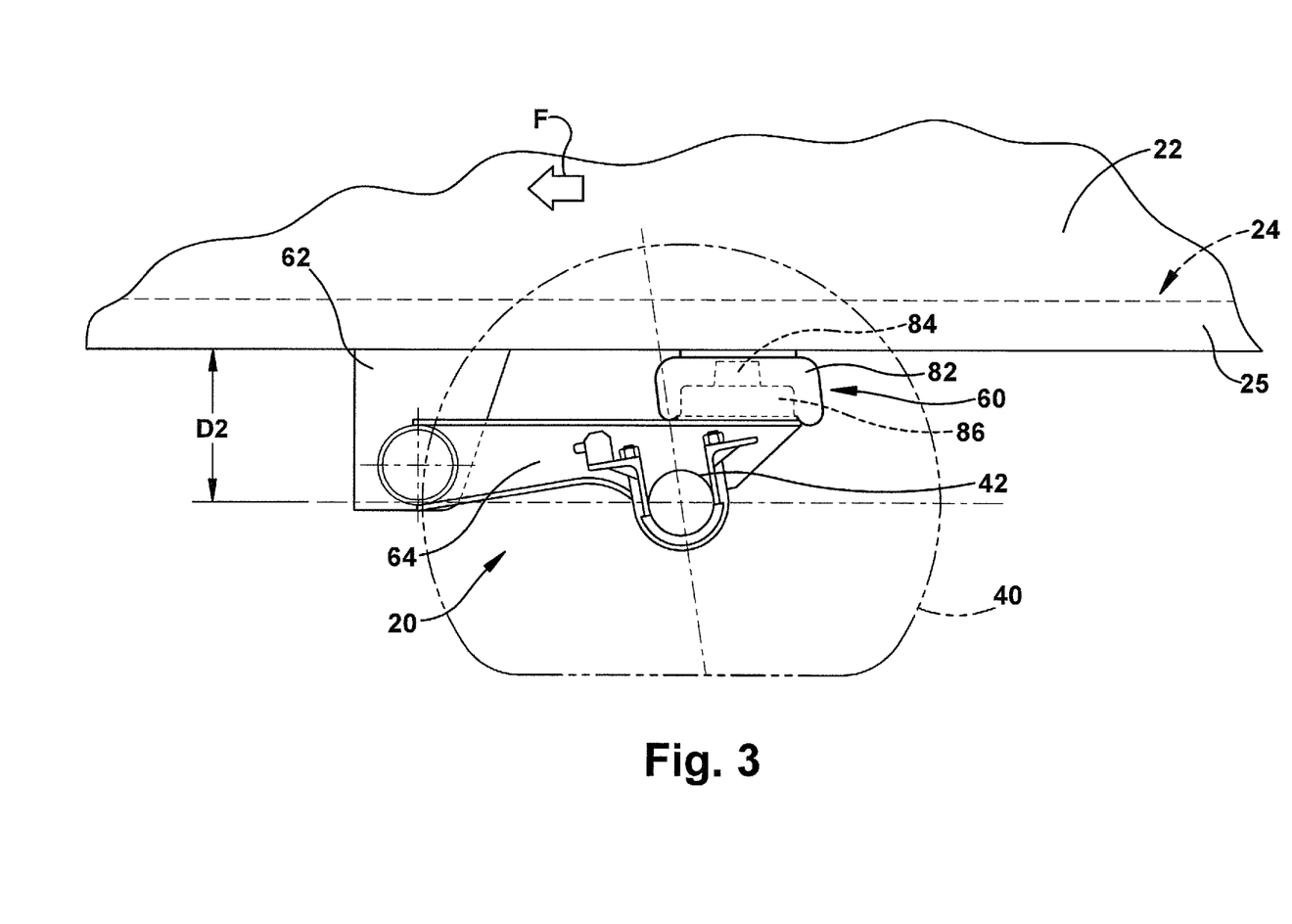
FIG. 3 is a view similar to FIG. 2 illustrating components in another relative position.

A reactive suspension assembly system 20 of an air-ride axle/suspension system 60 for use with a heavy-duty vehicle 22, such as trailer, according to one aspect is schematically illustrated in FIG. 1. The reactive suspension assembly system 20 for the heavy-duty vehicle 22 is particularly suited to a wide base single tire system, as illustrated in FIGS. 2 and 3. The reactive suspension assembly system 20 for a heavy-duty vehicle 22 may be employed with a dual tire arrangement and/or with multiple axles.

The reactive suspension assembly system 20 is carried by the heavy-duty vehicle 22. The heavy-duty vehicle 22 includes a vehicle frame 24 (FIGS. 2 and 3). The vehicle frame 24 is representative of various types of frames used for heavy-duty vehicles, and can be a primary frame or a sub-frame, such as a movable or non-movable slider without affecting the overall concept of the disclosed subject matter. The vehicle frame 24 typically includes a pair of elongated, longitudinally-extending, parallel and transversely-spaced main members 25, only one of which is illustrated in FIGS. 2 and 3. Longitudinally-spaced cross members (not shown) extend transversely between and are fixedly attached to the main members 25 of the frame 24, as is known. The front of the vehicle 22, or direction of normal forward movement, is indicated by the arrow F.

The reactive suspension assembly system 20 includes a tire and wheel assembly 40 operatively mounted on a respective end of an axle 42. It is understood that the reactive suspension assembly system 20 supports the other side of the axle 42 to complete an air-ride axle/suspension system 60, but only one of the suspension assembly systems is shown and described for clarity and convenience. It will be appreciated that while only one suspension assembly system 20 and only one tire and wheel assembly 40 on one side of a transversely extending axle 42 is illustrated in FIGS. 1-3, the description will apply equally to single tire or dual tires on either side of the axle and to vehicles 22 with multiple axles. Thus, when reference is made to "tire and wheel assembly" it will equally apply to a single tire or dual tires that are operatively mounted on an end of the axle 42.

The reactive suspension assembly system 20 includes the air-ride axle/suspension system 60 that absorbs forces that act on the vehicle 22 during operation. The axle/suspension system 60 is relatively rigid in order to resist roll forces and provide desirable ride and handling characteristics of the heavy-duty vehicle 22 during operation. The axle/suspension system 60 is also relatively flexible to assist in cushioning the vehicle 22 from vertical impacts and to comply with a road surface.

The reactive suspension assembly system 20 is mounted to the frame 24 at a hanger 62 in a known manner. The axle 42 is movable relative to the frame 24 between an operating or nominal relative position spaced apart a distance D1, as illustrated in FIG. 2, and a minimum relative position spaced apart a distance D2, as illustrated in FIG. 3 that is less than distance D1. The reactive suspension assembly system 20 includes a trailing arm beam 64 that may pivot relative to the hanger 62. The trailing arm beam 64 includes a front-end portion with a bushing assembly (not shown) to facilitate pivotal movement of the trailing arm beam relative to the hanger 62. Each trailing arm beam 64 also includes an intermediate portion which is fixedly attached to and captures the axle 42. While the illustrated aspects are described in the context of trailing arm axle/suspension systems, it will be apparent that the concept also may apply to leading arm axle/suspension systems.

Each reactive suspension assembly system 20 of the air-ride axle/suspension system 60 includes an air spring 82 and a bumper 84. The air spring 82 extends between the trailing arm beam 64 and the frame member 25. The air spring 82 is mounted on a rear portion of the trailing arm beam 64 and is operatively attached to the frame member 25. The bumper 84 may be attached to a piston 86 of, and located within, the air spring 82 of the reactive suspension assembly system 20. It will be apparent that the bumper 84 could be separate from the air spring 82 without detracting from the scope of the subject matter of this application. A brake system (not shown) typically is mounted on the axle 42 of the air-ride axle/suspension system 60, as is known.

Under certain operating conditions of the vehicle 22, such as when the tire and wheel assembly 40 experiences a flat, blow out or is greatly underinflated, exhausting the air spring 82 may cause the frame 24 to engage the bumper 84 directly or indirectly. The bumpers 84 of the air-ride axle/suspension system 60 act as a positive mechanical support stop for the vehicle 22. Depending on the configuration of the vehicle 22 and the air-ride axle/suspension system 60, the axle 42 is not forced away from the frame 24 when the air spring 82 is exhausted or vented. Depending on the configuration of the vehicle 22 and the air-ride axle/suspension system 60, the frame 24 could also lower in a direction toward the axle 42 when the air spring 82 is exhausted or vented. This may result in engagement between the bumper 84 and frame 24 to eliminate the suspension effect of the air spring 82 and provide stiffness between the frame 24 and the axle 42 to control roll forces of the vehicle 22. A change in ride and handling characteristics results from this stiffness and can be sensed by the operator of the vehicle 22. The operator is, thereby, alerted that a tire and wheel assembly 40 may require investigation and attention. The alert resulting from the change in ride and handling characteristics may be in any suitable form, such as haptic feedback through an operator's seat or steering wheel that the operator can feel.

An important feature of the air-ride axle/suspension system 60, when the air spring 82 is exhausted or vented in response to the predetermined condition being detected, is that the system does not force the axle 42 away from the frame 24 and closer to the road surface where the wheel and/or remaining tire could be damaged. The trailing arm beam 64 and the axle 42 would normally maintain the position relative to the vehicle frame 24 when air under pressure is vented or exhausted from the air spring 82, as illustrated in FIG. 2, because the air spring 82 on the opposite side of the axle may remain inflated. The axle 42 and frame 24 are first or initially spaced apart a relative distance D1 when the air spring 82 is inflated during normal operation of the vehicle 22. When it is desired to move the vehicle frame 24 relative to the axle 42, the air spring 82 is, or both air springs on the axle 42 are, deflated and a new relative position between the vehicle frame and the axle is established, as illustrated in FIG. 3. The axle 42 and frame 24 are, thus, spaced apart a different relative distance D2 which may be less than the distance D1.

In operation of the air-ride axle/suspension system 60, a control system (not shown) for the air springs 82 in the reactive suspension assembly system 20 includes a sensor (not shown) that detects the position of the axle 42 relative to the frame 24. A level or ride height control valve (not shown) of the control system may direct compressed air into the air spring 82 or exhaust air from the air spring as a function of the sensed relative position. As is known, the control system may be mounted on the hanger 62 and includes structure that moves upwardly and downwardly with the trailing arm beam 64 to activate the ride height control valve.

The air-ride axle/suspension system 60 includes a supply 102 (FIG. 1) of pressurized or compressed air that is typically provided by the vehicle 22. The supply 102 of pressurized or compressed air is typically provided by a compressor and/or a reservoir tank and will be referred to in this description as air supply 102. As is known, each air spring 82 of the air-ride axle/suspension system 60 fluidly communicates with the air supply 102 by conduit 110. When the vehicle 22 experiences a relatively heavy load or encounters a bump in the road or the like, the ride height control valve may actuate the flow of air from the air supply 102 into air spring 82 to bring the pneumatic pressure in the air spring to a level that is optimal for supporting the load and maintaining a desired ride height of the heavy-duty vehicle. When the heavy-duty vehicle 22 experiences a relatively lighter load or encounters a depression in the road or the like, the ride height control valve may actuate to exhaust air from the air spring 82 to reduce the pressure in the air spring and again bring the pneumatic pressure in the air spring to a level that is optimal for supporting the load and maintaining a desired ride height of the vehicle. In this manner, air spring 82 is charged with a fluid pressure that corresponds to the load or condition encountered by the vehicle 22.

The reactive suspension assembly system 20 of the axle/suspension system 60 may also include a tire inflation system 100 for monitoring and inflating or deflating the tire and wheel assembly 40 with pressurized fluid, such as air. The tire inflation system 100 may also be in fluid communication with the air supply 102 by conduit 104. The air supply 102 for the tire inflation system 100 may be separate from the air supply 102 for the air-ride axle/suspension system 60. The same air supply 102 may be used to supply the air-ride axle/suspension system 60 as well as the tire inflation system 100. The tire inflation system 100 may also include a tire pressure monitoring system (not shown) as is known. It is also contemplated that reactive suspension assembly system 20 may use a tire pressure monitoring system without the tire inflation system 100.

The air supply 102 is connected by fluid handling components to the vehicle tire and wheel assembly 40. A pneumatic conduit 104 extends between and interconnects the air supply 102 to the tire and wheel assembly 40. While a single tire and wheel assembly 40 is illustrated in FIG. 1, it is to be understood that tire inflation system 100 typically is utilized with multiple tire and wheel assemblies and multiple axles of the reactive suspension assembly system 20.

The tire inflation system 100 is a regulated tire inflation system for use with the air-ride axle/suspension system 60. It is to be understood that the regulated tire inflation system 100 is shown only by way of example, as the disclosed subject matter finds use with any known electronically-monitored, electronically-regulated, mechanically-regulated or pneumatically-regulated tire pressure inflation or monitoring system. For example, a valve 124 is placed in the conduit 110 to control fluid flow and pressure in the air spring 82. The valve 124 may receive a signal from a sensor 106 that is indicative of pressure in the tire and wheel assembly 40. The valve 124 closes to maintain pressure in the air spring 82 as a function of the signal from a sensor 106. The valve 124 opens to change pressure in the air spring 82 as a function of the signal from a sensor 106. The valve 124 may comprise the ride height control valve.

The reactive suspension assembly system 20 utilizes the sensor 106. It will be appreciated that if the reactive suspension assembly system 20 only includes a tire monitoring system (not shown), the reactive suspension assembly system 20 will still include the sensor 106. The sensor 106 senses a condition of the tire and wheel assembly 40 and communicates a signal over communication line 108 that is indicative of the sensed condition. The signal may be communicated by any suitable means, such as electronic, wireless, fluid or mechanical communication. When the sensor 106 senses and detects that a predetermined condition of the tire and wheel assembly 40 exists, the sensor may send the signal over communication line 108 for further handling or processing. The sensor 106 may communicate the signal that is indicative of the condition of the tire and wheel assembly 40 to a processor and/or controller. The signal may be used directly to control or activate the reactive suspension assembly system 20. In any event, the detected signal is used to control fluid pressure in the air spring 82.

The sensor 106 may be any type of suitable sensor, such as a pressure sensor in the conduit 104 or in the tire and wheel assembly 40. The predetermined condition may be low or no pressure in tire and wheel assembly 40 when the tire is flat or blown out. The sensor 106 may also be a flow sensor in the conduit 104. The predetermined condition would be the presence of a high air flow in the pneumatic conduit 104 from tire inflation system 100 attempting to fill a flat or blown out tire and wheel assembly 40.

The reactive suspension assembly system 20 includes a reactive exhaust or venting circuit 120 that may be discrete or separate from the tire inflation system 100. The exhausting or venting circuit 120 may replace or supplement the ride height control valve. All of the air springs 82 may be in fluid communication so a single venting circuit 120 may be used to vent all of the air springs on the axle 42 or multiple axles at the same time. The venting circuit 120 enables controlled deflation of air spring 82 or multiple air springs, based on specific detected predetermined conditions of the tire and wheel assembly 40, which will be described in the various exemplary aspects and implementations. For example, the venting circuit 120 reacts to the sensor 106 detecting that a predetermined condition, such as a flat tire or blowout of the tire and wheel assembly 40 has occurred.

The venting circuit 120 may include a venting or exhaust conduit 122 and a valve 142 located in the exhaust conduit. The valve 142 is normally closed to maintain pressure in the air spring 82. The valve 142 is controlled in response to the sensor 106 associated with the tire and wheel assembly 40 detecting that a predetermined condition exists. The communication may be with the processor or controller that receives information from the sensor 106 or communicated directly to the valve 142 over communication line 108. The valve 142 is actuated to open in response to receiving the signal from the sensor 106 or controller that a predetermined condition exists at the tire and wheel assembly 40. Actuation of the valve 142 vents or exhausts pressure from the air spring 82. The venting or exhausting pressure from the air spring 82 can occur suddenly or controlled slowly. The venting or exhausting pressure from the air spring 82 through the valve 142 can be to atmosphere. The valve 124 and valve 142 may be combined in structure and/or function. In such a combined structure and or function, the valve could also serve to deflate the air spring in response to the signal from sensor 106.

In the aspect illustrated in FIGS. 1-3, the air spring 82 associated with the flat or blown out tire and wheel assembly 40 reacts by venting or exhausting so the axle 42 is not forced downwardly. The axle 42 typically may still be parallel to the road surface if both air springs 82 associated with the axle are exhausted. The frame 24 may lower if all air springs on all axles are vented and engage one or more bumpers 84. The bumpers 84 stop or limit relative movement between the frame 24 and the trailing arm beams 64 that carry the axle 42. Venting or exhausting pressure from all the air springs 82 in response to the existence of the predetermined condition of the tire and wheel assembly 40 causes several desirable effects. Since the frame 24 may now engage the bumpers 84 when there is a flat tire, ride and handling of the vehicle 22 can be affected and feel different to the operator. This may alert the driver or operator of the vehicle 22 through the haptic alert in the steering wheel or seat or other suitable alert that an investigation of the tire and wheel assembly 40 may be warranted. This allows the driver to stop the vehicle 22 and investigate the conditions of the tire and wheel assemblies 40 sooner than would be likely during operation of heavy-duty vehicles with previously known axle/suspension systems. Otherwise, it is not necessarily easy to sense the presence of a flat tire on the vehicle 22.

Because the air spring 82 is deflated, the air-ride axle/suspension system 60 associated with the axle 42 of the flat tire and wheel assembly 40 may relatively position the axle closer to the frame 24, from the initial or first position illustrated in FIG. 2 to the second position illustrated in FIG. 3. This keeps the wheel of the flat or blown out tire from being forced to the ground and minimizes the chance of damage to the relatively expensive wheel and perhaps even the tire if it remains mounted on the wheel. This potentially may eliminate the cost of repairing or replacing a damaged wheel and/or tire.

A flat tire may also lead to ride and handling characteristics the vehicle 22 to change, so it is desirable for the axle/suspension system 60 to be relatively stiff and, thus, provide the vehicle with relatively different ride and handling characteristics. If both air springs 82 on the axle 42 are deflated when there is a flat tire, the axle is located closer to the frame 24 and the bumpers 84 may be in a position to contact the frame and roll stability to the vehicle 22 is provided. Typically, when an air-ride axle/suspension system 60 is inflated, the air springs 82 are not as stiff in order to cushion the ride of the vehicle 22. When the frame 24 lowers to engage or ride on the bumpers 84 of the air springs 82, the center of gravity of the vehicle 22 lowers and the suspension stiffens. This improves the ride and handling characteristics of the vehicle 22 when the tire and wheel assembly 40 experiences a flat or blowout condition. This change in the ride and handling characteristics of the heavy-duty vehicle 22 can be better communicated to the operator so an investigation of the condition of the heavy-duty vehicle can be performed.

Figure 4:
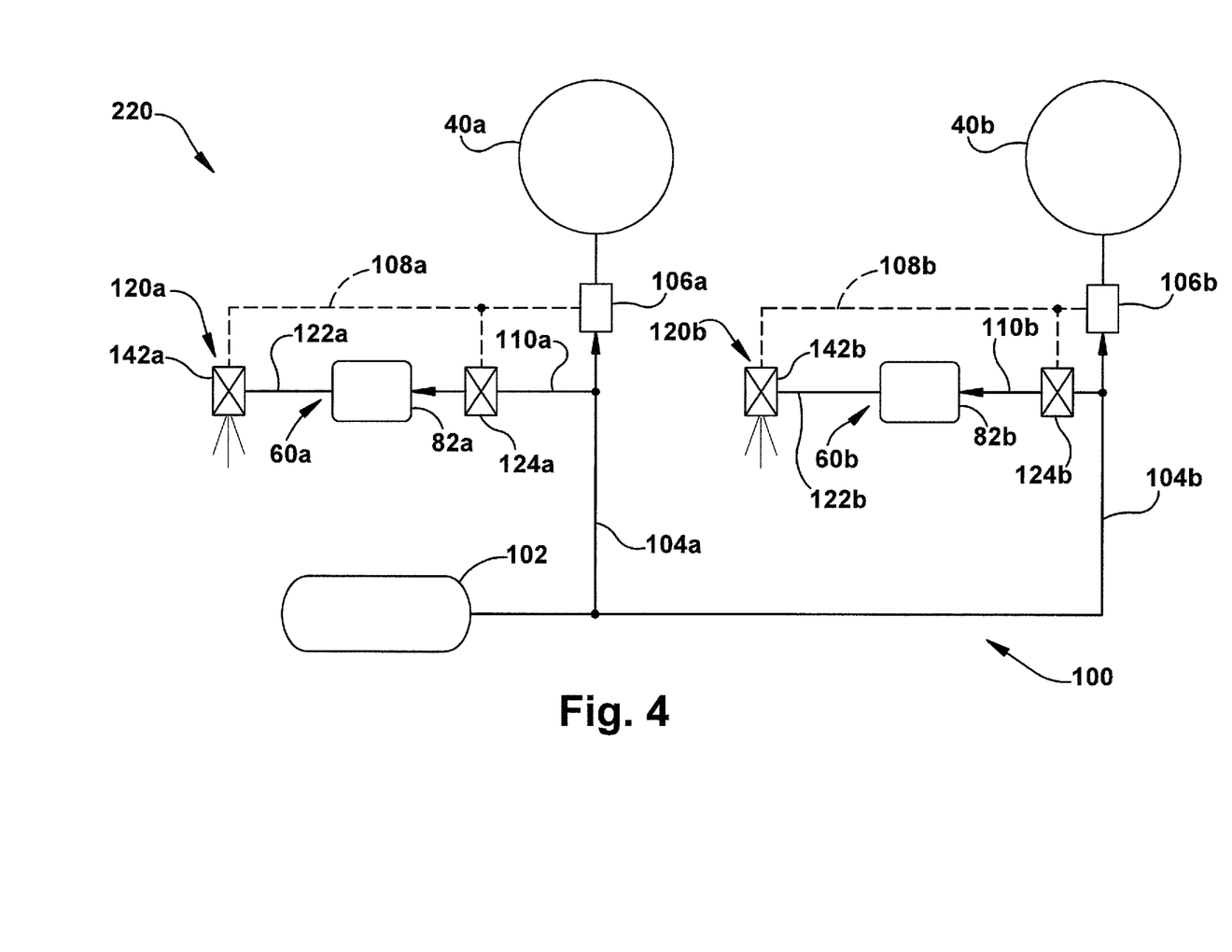
FIG. 4 is a schematic view of a reactive suspension assembly system, according to another aspect.
Figure 5:
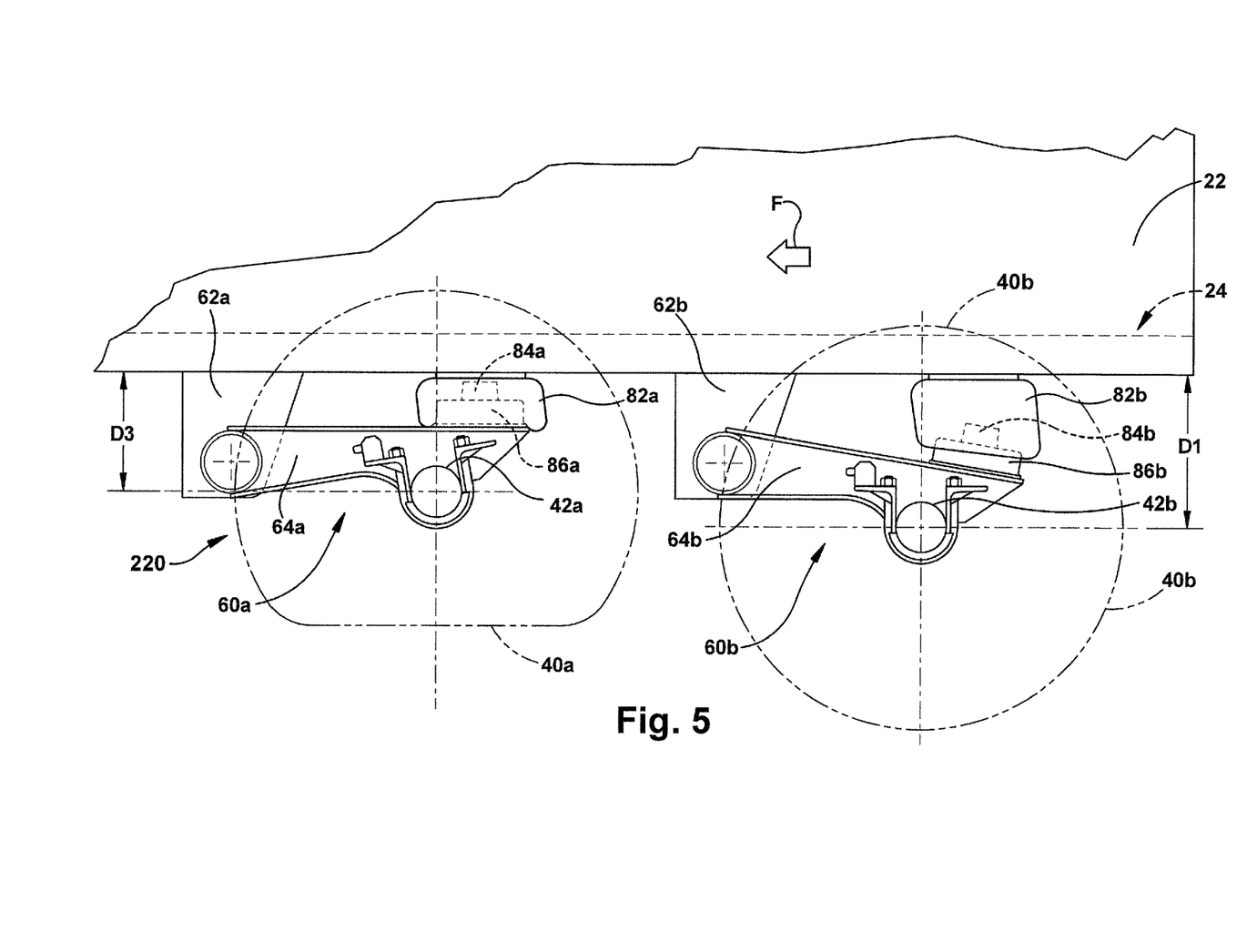
FIG. 5 is a fragmentary side elevation view, with portions of some components shown in phantom, of a portion of the reactive vehicle suspension assembly system according to the aspect illustrated in FIG. 4 with components in different exemplary relative positions.
Figure 6:
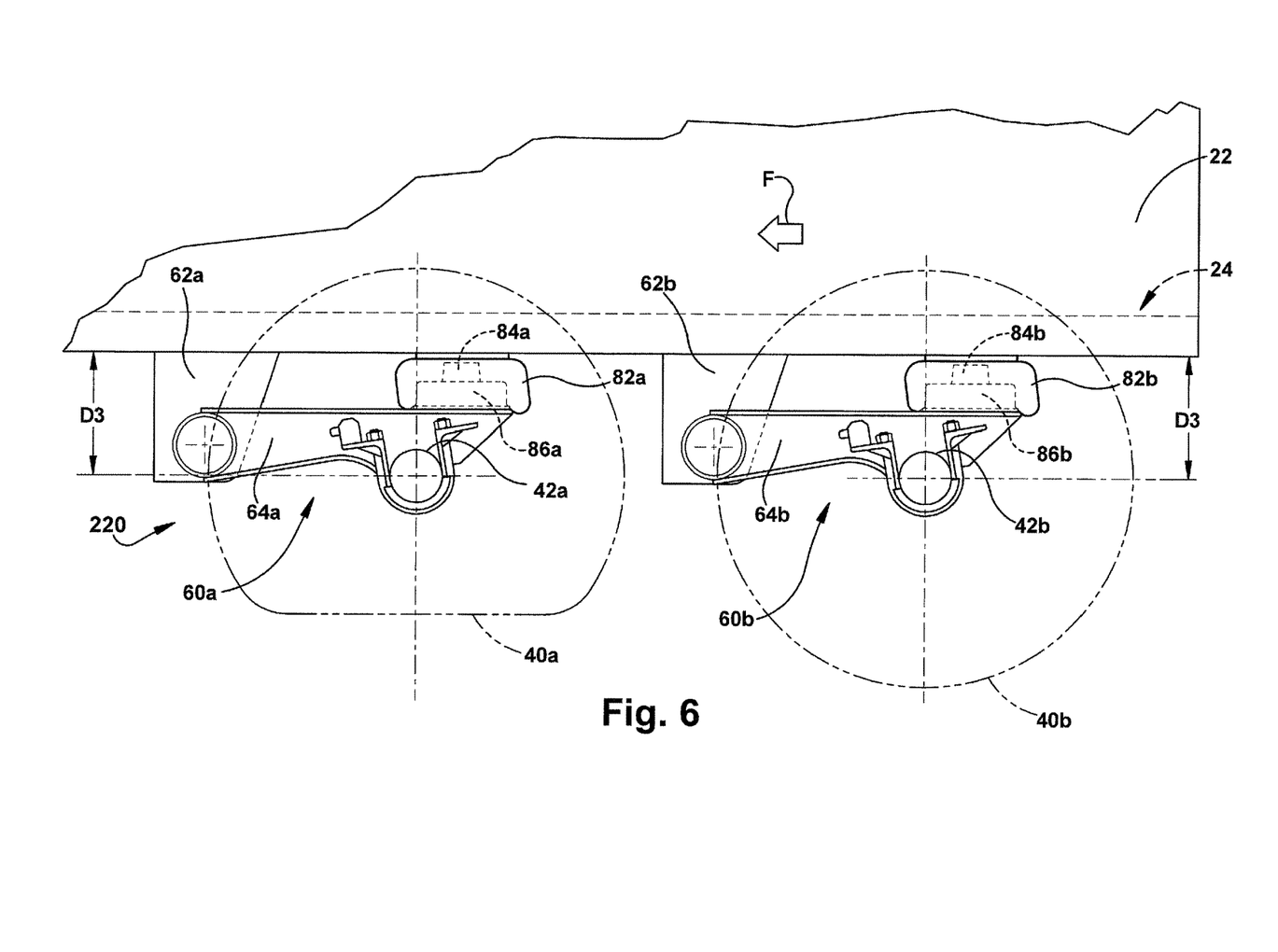
FIG. 6 is a view similar to FIG. 5 illustrating some components in other relative positions.

A reactive suspension assembly system 220 for a heavy-duty vehicle 22, according to another aspect is illustrated in FIGS. 4-6. The reactive suspension assembly system 220 for the heavy-duty vehicle 22 provides similar features and advantages as the reactive suspension assembly system 20.

The reactive suspension assembly system 220 includes two tire and wheel assemblies 40a, 40b, on the same side of the heavy-duty vehicle 22. The tire and wheel assemblies 40a, 40b are illustrated as being operatively mounted on separate axles 42a, 42b (FIGS. 5 and 6) of separate air-ride axle/suspension systems 60a, 60b, respectively. While only one side of the heavy-duty vehicle 22 is shown, other tire and wheel assemblies 40a, 40b are operatively mounted on respective axles 42a, 42b on the opposite side, as is known. The description for the illustrated side of the heavy-duty vehicle 22 will equally apply to the side that is not shown. Preferably, the tire and wheel assemblies 40a, 40b are deployed in a wide base single tire system on the heavy-duty vehicle 22, but a dual tire configuration may be accommodated.

The heavy-duty vehicle 22 includes a vehicle frame 24. The reactive suspension assembly system 220 includes an air-ride axle/suspension system 60a that is carried by the heavy-duty vehicle 22. It is understood that a similar reactive suspension assembly 220 supports the other side of the axle 42a to complete the axle/suspension system 60a, but only one of the reactive suspension assembly systems is shown and described for clarity and convenience. It will be appreciated that while only one reactive suspension assembly system 220 and only one tire and wheel assembly 40a on one side of a transversely extending axle 42a is illustrated in FIGS. 5-6, the description will apply equally to one or two tire and wheel assemblies on both sides of the axle.

The axle/suspension system 60a is designed to absorb a portion of the forces that act on the vehicle 22 as it is operating. The first axle 42a is supported for relative movement by the vehicle frame 24. The axle/suspension system 60a is mounted to the frame 24 by a hanger 62a. The air-ride axle/suspension system 60a includes a trailing arm beam 64a that may pivot relative to the hanger 62a and carry the axle 42a. The first axle 42a is movable relative to the frame 24 between an operating or initial relative position and a minimum relative position where the axle and frame are spaced apart a distance D3 (FIG. 5).

The reactive suspension assembly system 220 of the axle/suspension system 60a also includes an air spring 82a and a bumper 84a. The air spring 82a is mounted on a rear portion of the trailing arm beam 64a. The air spring 82a extends between the trailing arm beam 64a and the frame 24. The bumper 84a may be attached to a piston 86a, and located within, the air spring 82a.

The air-ride axle/suspension system 60a applies a force to relatively move the axle 42a in a direction away from the frame 24 or maintain the relative initial position when the air spring 82a is inflated. This is typically the relative position during operation of the heavy-duty vehicle 22 and the tire and wheel assembly 40a is inflated to about its target pressure and in contact with the ground. When it is desired to force the axle 42a away from the frame 24 or to accommodate an increased load carried by the heavy-duty vehicle, the pressure in the air spring 82a is increased. The axle 42a is not forced away from the vehicle frame 24 when air is vented or exhausted from the air spring 82a.

In operation of the air-ride axle/suspension system 60a, a control system (not shown) for the air spring 82a includes a sensor (not shown) that detects the position of the axle 42a relative to the frame 24. A ride height control valve (not shown) may direct compressed air into the air spring 82a or exhausts air from the air spring as a function of the sensed relative position.

The reactive suspension assembly system 220 of the axle/suspension system 60a may include a tire inflation system 100 (FIG. 4). The tire inflation system 100 for the tire and wheel assembly 40a includes a vehicle air supply 102. The air supply 102 typically is charged by a compressor and/or a reservoir tank. The air supply 102 is connected by components to the vehicle tire and wheel assembly 40a. A pneumatic conduit 104a extends between and interconnects the air supply 102 to the tire and wheel assembly 40a. The vehicle air supply 102 may be used to supply the air-ride axle/suspension system 60a through conduit 110a as well as supply the tire inflation system 100. The vehicle air supply 102 for the tire inflation system 100 may be separate from the supply of air for the air-ride axle/suspension system 60a.

The tire inflation system 100 includes a sensor 106a. The sensor 106a senses a condition of the tire and wheel assembly 40a and sends a signal over communication line 108a. When sensor 106a detects that a predetermined condition of the tire and wheel assembly 40a exists the sensor sends a signal over communication line 108a that is indicative of the predetermined condition occurring. The predetermined condition may be low or no pressure in tire and wheel assembly 40a or may be excessive flow in a direction towards the tire and wheel assembly when the tire is flat or blown out.

The air-ride axle/suspension system 60a includes a reactive exhaust or venting circuit 120a that is discrete or separate from the tire inflation system 100. The venting circuit 120a enables controlled deflation of the air spring 82a, based on specific predetermined conditions that are detected. For example, the venting circuit 120a reacts to the sensor 106a of the tire inflation system 100 detecting that a predetermined condition, such as a flat tire or blowout of the tire, is occurring.

The venting circuit 120a includes an exhaust conduit 122a and a valve 142a located in the exhaust conduit. The valve 142a is controlled in response to the sensor 106a associated with the tire and wheel assembly 40a detecting that a predetermined condition exists. The communication may be with a processor or controller that receives information from the sensor 106a or communicated directly to the valve 142a over communication line 108a. The valve 142a is actuated to open in response to receiving the signal from the sensor 106a or controller that a predetermined condition exists at the tire and wheel assembly 40a. Actuation of the valve 142a vents or exhausts pressure from the air spring 82a. The venting or exhausting pressure from the air spring 82a can occur suddenly or controlled slowly. The venting or exhausting pressure from the air spring 82a and from the valve 142a can be to atmosphere. The valve 142a is normally closed to maintain pressure in the air spring 82a. The valve 142a may be in direct or indirect communication with the sensor 106a. The valve 142a opens in response to receiving a signal from the sensor 106a, or from an intervening processor and/or control system, that the predetermined condition exists at the tire and wheel assembly 40a. The valve 142a vents or exhausts pressure from the air spring 82a.

The reactive suspension assembly system 220 also includes another axle/suspension system 60b. The axle/suspension system 60b is designed to absorb another portion of the forces that act on the vehicle 22 as it is operating. A second axle 42b is supported for relative movement by the vehicle frame 24. The axle/suspension system 60b is mounted to the frame 24 at a hanger 62b for relative movement of the second axle 42b and frame 24 between an operating or initial relative position where the axle and frame are spaced apart a distance D1, as illustrated in FIG. 5, and a closer minimum relative distance D3 (FIG. 6) between the second axle and frame. The air-ride axle/ suspension system 60*b* includes a trailing arm beam 64*b* that may pivot relative to the hanger 62*b*.

Each air-ride axle/suspension system 60*b* of the reactive suspension assembly system 220 includes an air spring 82*b* and a bumper 84*b*. The air spring 82*b* is mounted on a rear portion of the trailing arm beam 64*b*. The air spring 82*b* extends between the trailing arm beam 64*b* and the frame 24. The bumper 84*b* may be attached to a piston 86*b*, and located within, the air spring 82*b* of the reactive suspension assembly system 220.

The axle/suspension system 60*b* establishes the relative position of the axle 42*b* and the frame 24. When it is desired to move the axle 42*b* away from the frame 24, pressure in the air spring 82*b* is increased, and the increased pressure urges the axle away in a direction away from the frame to an operational or nominal position with the tire and wheel assembly 40*b* on the ground, as illustrated in FIG. 5. The axle 42*b* is not forced in a direction away from the vehicle frame 24 when air is vented or exhausted from the air spring 82*b*.

In operation of the air-ride axle/suspension system 60*b*, a control system (not shown) for the air springs 82*b* includes a sensor (not shown) that detects the position of the axle 42*b* relative to the frame 24. A ride height control valve (not shown) may direct compressed air into the air spring 82*b* or exhaust air from the air spring as a function of the sensed relative position.

The tire inflation system 100 for the tire and wheel assembly 40*b* may include the vehicle air supply 102. The air supply 102 is connected by components to the vehicle tire and wheel assembly 40*b*. A pneumatic conduit 104*b* extends between and interconnects the air supply 102 to the tire and wheel assembly 40*b*. The vehicle air supply 102 may be used to supply the air-ride axle/suspension system 60*b* through conduit 110*b* as well supplying the tire inflation system 100. The vehicle air supply 102 for the tire inflation system 100 may be separate from a supply of air for the air-ride axle/suspension system 60*b*.

The tire inflation system 100 includes a sensor 106*b*. The sensor 106*b* detects if a predetermined condition of the tire and wheel assembly 40*b* exists and sends a signal over communication line 108*b*. The predetermined condition may be low or no pressure in, or may be excessive flow towards, the tire and wheel assembly 40*b* when the tire is flat or blown out.

A venting circuit 120*b* includes an exhaust conduit 122*b* and a valve 142*b* located in the exhaust conduit. The valve 142*b* is normally closed to maintain pressure in the air spring 82*b*. The valve 142*b* is in communication with the sensor 106*b*. The valve 142*b* is controlled in response to the sensor 106*b* associated with the tire and wheel assembly 40*b* detecting that a predetermined condition exists. The communication may be with the processor or controller that receives information from the sensor 106*b* or communicated directly to the valve 142*b* over communication line 108*b*. The valve 142*b* is actuated to open in response to receiving the signal from the sensor 106*b* or controller that a predetermined condition exists at the tire and wheel assembly 40*b*. Actuation of the valve 142*b* vents or exhausts pressure from the air spring 82*b*. The venting or exhausting pressure from the air spring 82*b* can occur suddenly or controlled slowly. The venting or exhausting pressure from the air spring 82*b* and from the valve 142*b* can be to atmosphere. The valve 142*b* opens in response to receiving a signal that the predetermined condition exists at the tire and wheel assembly 40*b* to vent or exhaust pressure from the air spring 82*b*. It will also be apparent that the valve 142*a* may open in response to receiving a signal from sensor 106*b* that the predetermined condition exists at the tire and wheel assembly 40*b* to vent or exhaust pressure from the air spring 82*a*. In any event, the axle 42*a* or 42*b* carrying the respective tire and wheel assembly 40*a* or 40*b* that has the predetermined condition is not forced in a direction away from the frame 24.

In the aspect illustrated in FIGS. 4-5 and described above, the air spring 82*a* associated with the flat or blown out tire and wheel assembly 40*a* reacts so the axle 42*a* is not biased in a direction away from the frame 24 and, thus, the frame 24 is free to engage the bumper 84 if the air springs 82*a* on axle 42*a* are exhausted. The axle 42*a* is, thus, positioned a distance D3 (FIG. 5) from the frame 24. The distance D3 is less than the distance D1 of the initial relative position. This prevents or minimizes damage to a component of the tire and wheel assembly 40*a*.

The air-ride axle/suspension system 60*b* includes a reactive exhaust or venting circuit 120*b* that is discrete or separate from the tire inflation system 100. The venting circuit 120*b* enables controlled deflation of air spring 82*b*, based on specific predetermined conditions being detected. For example, the venting circuit 120*b* may react to either of the sensors 106*a* or 106*b* of the tire inflation system 100 detecting that a predetermined condition, such as a flat tire or blowout of the tire has occurred in either of the tire and wheel assemblies 40*a*, 40*b*. Likewise, the venting circuit 120*a* may react to either of the sensors 106*a* or 106*b* of the tire inflation system 100 detecting that a predetermined condition, such as a flat tire or blowout of the tire has occurred in either of the tire and wheel assemblies 40*a*, 40*b*.

Both of the air springs 82*a* and 82*b* on both sides of the vehicle 22 could be vented so the frame 24 engages the bumpers 84*b* and 84*b* on both sides of the vehicle to help the ride and handling characteristics of the vehicle when the vehicle experiences the predetermined condition. In the aspect illustrated in FIG. 6 and described above, when a flat or blow out of the tire and wheel assembly 40*a* is detected both of the air springs 82*a*, 82*b* react on both sides of the heavy-duty vehicle 22. Both of the air springs 82*a*, 82*b* are vented which results in the frame 24 lowering. The frame 24 may engage the bumpers 84*a*, 84*b* to stiffen the ride and handling characteristics of the vehicle. Both of the axles 42*a*, 42*b* are, thus, positioned the distance D3 from the frame 24. This change in relative position between the axles 42*a*, 42*b* and the frame 24 results in a change in ride and handling characteristics which can be sensed by the operator of the heavy-duty vehicle 22.

A method is provided, according to yet another aspect, for establishing a relative position between a vehicle frame 24 and a relatively movable axle 42 that is supported for movement relative to the frame. The method includes steps outlined in the description that is presented above and illustrated in FIGS. 1-6. The method includes establishing a first relative position between the axle 42 and the frame 24 as a function of pressure in the air spring 82 located between the frame and the axle when the vehicle is operating in a normal condition. The axle 42 is spaced a distance D1 (FIG. 2) from the vehicle frame 24 in the first relative position when the tire and wheel assembly 40 is inflated to approximately the target pressure.

A tire and wheel assembly 40 is operatively mounted to an end portion of the axle 42. A sensor 106 determines an inflation condition of the tire and wheel assembly 40. Fluid pressure is vented from the air spring 82 to allow the axle 42 and vehicle frame 24 to establish a second relative position in response to the sensor 106 detecting that a predetermined inflation condition of the tire and wheel assembly 40 exists, such as a flat tire or blowout. The second relative position may be different than the first relative position. The axle 42 may now be spaced a distance D2 (FIG. 3) from the vehicle frame 24 in the second relative position to reduce the chance of damage to a component of the tire and wheel assembly 40.

The method may further include mounting a bumper 84 between the vehicle frame 24 and the axle 42 so the bumper contacts the vehicle frame and the trailing arm beam 64 when the axle and vehicle frame are in the second relative position. The frame 24 may also engage the bumper 84 to stiffen and change the ride and handling characteristics of the vehicle 22 and alert the operator. The sensor 106 determines fluid pressure of the tire and wheel assembly 40 and vents fluid pressure from the air spring 82 to establish the second relative position when the sensor determines that the pressure is less than a predetermined pressure, which is generally less than the target pressure. The sensor 106 may alternately determine that the flow of fluid to the tire and wheel assembly 40 is above a predetermined flow condition and vent fluid pressure from the air spring 82 to establish the second relative position between the frame 24 and axle 42.

It is understood that the structure of the reactive suspension assembly system may, in response to a predetermined condition such as a flat or blowout in one or more tires, exhaust air from one or more air springs in one or more axle/suspension systems of the heavy-duty vehicle. Thus, potential damage to a component of the tire and wheel assembly can be avoided, the driver is alerted and/or the ride and handling characteristics of the heavy-duty vehicle are changed.

The concept has been described with reference to specific aspects. It is understood that this description and illustration are by way of example and not by way of limitation. Potential modifications and alterations will occur to others upon a reading and understanding of the subject matter of this application, and it is understood that all such modifications and alterations and equivalents are encompassed by the disclosed subject matter.

It is to be understood that the structure of the reactive suspension assembly system may be altered or rearranged, or certain components omitted or added, without affecting the overall concept or operation of the disclosed subject matter. For example, the location, size and arrangement of components may be altered based on specific design requirements, such as the type of sensor used or other means for detecting the condition of the tire and wheel assembly. It is to be further understood that the subject matter of this application finds utility in types of tire inflation systems and axle/suspension systems for heavy-duty vehicles, other than those shown and described herein without affecting the concept or operation of the subject matter. Moreover, gases other than air that may be compressed and follow the principles of fluid flow, including nitrogen, helium, argon, carbon dioxide, and the like, may be employed without affecting the concept or operation of the subject matter. Accordingly, the reactive vehicle air-ride axle/suspension system and method are simple and effective and overcome disadvantages of operating previously known heavy-duty vehicles.

What is claimed is:

1. An air-ride axle/suspension system for a heavy-duty vehicle, the heavy-duty vehicle having a frame and a pair of suspension assemblies supporting opposite ends of an axle for relative movement with the frame, the air-ride axle/suspension system comprising:
   an air spring associated with at least one of the suspension assemblies, the air spring establishing a first relative position between at least a portion of the axle and the frame as a function of fluid pressure in the air spring;
   a tire and wheel assembly operatively mounted to an end portion of the axle that is associated with the air spring;
   a sensor to detect an inflation condition of the tire and wheel assembly; and
   a venting system to exhaust fluid pressure from the air spring and establish a second relative position between the at least a portion of the axle and the frame that is different than the first relative position in response to detecting a predetermined inflation condition of the tire and wheel assembly.

2. The air-ride axle/suspension system of claim 1 further including a system for alerting an operator of the heavy-duty vehicle in response to the predetermined inflation condition of the tire and wheel assembly being detected.

3. The air-ride axle/suspension system of claim 1 wherein the axle is not forced in a direction away from the frame to establish the second relative position to protect the tire and wheel assembly from damage due to contact with a surface upon which the heavy-duty vehicle is operating.

4. The air-ride axle/suspension system of claim 1 wherein the frame moves in a direction towards the at least a portion of the axle to establish the second relative position.

5. The air-ride axle/suspension system of claim 1 further including a supply of air under pressure in fluid communication with at least the tire and wheel assembly.

6. The air-ride axle/suspension system of claim 5 wherein the sensor detects flow of the fluid from the supply of air to the tire and wheel assembly.

7. The air-ride axle/suspension system of claim 6 wherein the venting system exhausts fluid pressure from the air spring to establish the second relative position in response to detecting flow of the fluid from the supply of air to the tire and wheel assembly at an amount above a predetermined amount.

8. The air-ride axle/suspension system of claim 5 wherein the sensor detects fluid pressure in the tire and wheel assembly.

9. The air-ride axle/suspension system of claim 8 wherein the venting system exhausts fluid pressure from the air spring to establish the second relative position in response to detecting the pressure in the tire and wheel assembly below a predetermined amount.

10. The air-ride axle/suspension system of claim 1 further including a bumper located between the frame and axle, the bumper contacting the frame and the axle when the axle and frame are in the second relative position.

11. An air-ride axle/suspension system for a heavy-duty vehicle, the heavy-duty vehicle having a frame, the air-ride axle/suspension system comprising:
   a first axle supported for movement relative to the frame;
   a first air spring system to establish a first position of the first axle relative to the frame as a function of fluid pressure in the first air spring system;
   a first tire and wheel assembly operatively mounted to the first axle;
   a second axle supported for movement relative to the frame;
   a second air spring system to establish a second position of the second axle relative to the frame as a function of fluid pressure in the second air spring system;
   a second tire and wheel assembly operatively mounted to the second axle;

a sensor to detect an inflation condition of at least one of the first tire and wheel assembly and of the second tire and wheel assembly; and a venting system to exhaust fluid pressure from at least one of the first and second air spring systems to establish a third relative position between at least one of the first and second axles and the frame different than the first and second relative positions upon detecting a predetermined inflation condition of at least one of the first and second tire and wheel assemblies.

12. The air-ride axle/suspension system of claim 11 wherein the sensor detects a flow of pressurized fluid from a supply of air to the tire and wheel assembly, the sensor communicating a signal to indicate that a determined flow is above a predetermined flow to initiate exhausting fluid pressure from at least one of the first and second air spring systems.

13. The air-ride axle/suspension system of claim 11 wherein the sensor detects a fluid pressure of a tire and wheel assembly and communicates a signal to indicate that the detected fluid pressure of the tire and wheel assembly is below a predetermined pressure to initiate exhausting fluid pressure from at least one of the first and second air spring systems.

14. The air-ride axle/suspension system of claim 11 wherein the venting system exhausts fluid pressure from the first and second air spring systems to establish the third relative position different than the first and second relative positions between the frame and the first and second axles upon detecting a predetermined inflation condition of at least one of the first and second tire and wheel assemblies exists.

15. The air-ride axle/suspension system of claim 11 further including a first bumper located between the frame and the first axle and a second bumper located between the frame and second axle, the first and second bumpers contact the frame and the respective first and second axles when the first and second axles and frame are in the third relative position.

16. A method of establishing a relative position between a heavy-duty vehicle frame and an axle that is supported for relative movement by the frame, the method comprising the steps of:

mounting a tire and wheel assembly to the axle;

establishing a first position of the axle relative to the frame as a function of fluid pressure in an air spring located between the frame and the axle;

sensing an inflation condition of the tire and wheel assembly; and venting fluid pressure from the air spring to allow the axle and frame to establish a second relative position between the axle and the frame different than the first relative position in response to sensing a predetermined inflation condition of the tire and wheel assembly.

17. The method of claim 16 wherein the sensing step includes detecting a fluid pressure in the tire and wheel assembly and venting fluid pressure from the air spring to establish the second relative position in response detecting that the fluid pressure is less than a predetermined pressure.

18. The method of claim 16 wherein the sensing step includes detecting a flow of fluid to the tire and wheel assembly and venting fluid pressure from the air spring to establish the second relative position in response to detecting that the flow of fluid is above a predetermined flow.

19. The method of claim 16 wherein the first relative position between the axle and the frame has a first distance and second relative position between the axle and the frame has a second distance less than the first distance.

20. The method of claim 16 further including the step of mounting a bumper between the frame and the axle so the bumper contacts the frame and the axle when the axle and frame are in the second relative position.

* * * * *

UNITED STATES PATENT AND TRADEMARK OFFICE
CERTIFICATE OF CORRECTION

PATENT NO. : 10,286,746 B2
APPLICATION NO. : 15/662364
DATED : May 14, 2019
INVENTOR(S) : R. Scott Fulton Page 1 of 1

It is certified that error appears in the above-identified patent and that said Letters Patent is hereby corrected as shown below:

In the Claims

Amend Claim 17, Column 16, Line 21, after the word "response" and before the word "detecting" insert the word --to--.

Amend Claim 19, Column 16, Line 30, after the word "and" and before the word "second" insert the word --the--.

Signed and Sealed this
Twenty-third Day of July, 2019

Andrei Iancu
*Director of the United States Patent and Trademark Office*